(12) United States Patent
Su et al.

(10) Patent No.: US 12,592,739 B2
(45) Date of Patent: Mar. 31, 2026

(54) METHOD FOR DYNAMICALLY CONTROLLING RADIO FREQUENCY CIRCUIT, MODEM CHIP AND COMMUNICATION DEVICE

(71) Applicant: MEDIATEK Inc., Hsinchu (TW)

(72) Inventors: Chun-Wei Su, Hsinchu (TW); Wei-Yi Wang, Hsinchu (TW); Yuan-Hwui Chung, Hsinchu (TW); Tz-Yuan Shiu, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 334 days.

(21) Appl. No.: 18/448,449

(22) Filed: Aug. 11, 2023

(65) Prior Publication Data

US 2024/0063839 A1     Feb. 22, 2024

Related U.S. Application Data

(60) Provisional application No. 63/371,770, filed on Aug. 18, 2022.

(51) Int. Cl.
H04B 1/40          (2015.01)
H04W 4/80          (2018.01)
(52) U.S. Cl.
CPC ..................................... H04B 1/40 (2013.01)
(58) Field of Classification Search
None
See application file for complete search history.

(56) References Cited

U.S. PATENT DOCUMENTS

| | | | | |
|---|---|---|---|---|
| 7,016,661 | B2 * | 3/2006 | Gorday | H04B 1/406 |
| | | | | 329/316 |
| 7,336,602 | B2 * | 2/2008 | Silvester | H04L 1/0001 |
| | | | | 370/242 |
| 9,391,368 | B2 * | 7/2016 | Clevorn | H01Q 3/2605 |
| 9,524,092 | B2 * | 12/2016 | Ren | G06F 1/32 |
| 9,967,018 | B2 * | 5/2018 | Clevorn | H04B 7/061 |
| 10,142,007 | B2 * | 11/2018 | Clevorn | H04B 7/0689 |
| 10,811,913 | B2 * | 10/2020 | Qiu | H04B 5/263 |
| 10,842,348 | B2 * | 11/2020 | Rama Rao | H04W 52/0229 |
| 12,007,925 | B1 * | 6/2024 | Xie | H04L 12/40 |
| 12,301,336 | B2 * | 5/2025 | Park | H04J 11/005 |
| 12,335,342 | B2 * | 6/2025 | Hua | A61B 5/686 |
| 2019/0379242 | A1 * | 12/2019 | Yeo | G06F 1/26 |
| 2022/0247506 | A1 * | 8/2022 | Park | H04L 25/03165 |

* cited by examiner

*Primary Examiner* — Tuan A Tran
(74) *Attorney, Agent, or Firm* — McClure, Qualey & Rodack, LLP

(57)                     ABSTRACT

A method for dynamically controlling a radio frequency circuit, a modem chip and a communication device are provided. The method for dynamically controlling the radio frequency circuit includes the following steps. At least one operation information is obtained. The operation information includes a software information, a hardware information and a firmware information. A plurality of working modes of the radio frequency circuit are switched to fit the operation information.

20 Claims, 6 Drawing Sheets

1000

METHOD FOR DYNAMICALLY CONTROLLING RADIO FREQUENCY CIRCUIT, MODEM CHIP AND COMMUNICATION DEVICE

This application claims the benefit of U.S. provisional application Ser. No. 63/371,770, filed Aug. 18, 2022, the disclosure of which is incorporated by reference herein in its entirety.

TECHNICAL FIELD

The disclosure relates in general to a method for controlling a circuit, a chip and an electronic device, and more particularly to a method for dynamically controlling a radio frequency circuit, a modem chip and a communication device.

BACKGROUND

Communication technologies have been developed rapidly. The communication technologies have been applied to several kinds of electric devices. For example, Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements. 5th Generation (5G) New Radio (NR) 5G NR is a newly developed wireless communication technology.

In order to provide more efficient communication services and improve user experience, researchers are working on any method for reducing power consumption of a communication device in wireless communication.

SUMMARY

The disclosure is directed to a method for dynamically controlling a radio frequency circuit, a modem chip and a communication device. A plurality of working modes of a radio frequency circuit of the modem chip are dynamically switched according to the operation information which includes a software information, a hardware information and a firmware information. The power consummation and the device performance could be balanced. As such, more efficient communication services and improved user experience could be provided.

According to one embodiment, a method for dynamically controlling a radio frequency circuit is provided. The method for dynamically controlling the radio frequency circuit includes the following steps. At least one operation information is obtained. The operation information includes a software information, a hardware information and a firmware information. A plurality of working modes of the radio frequency circuit are switched to fit the operation information.

According to another embodiment, a modem chip is provided. The modem chip includes a radio frequency circuit, a digital circuit and a controller. The digital circuit is coupled to the radio frequency circuit. The controller is coupled to the digital circuit and the radio frequency circuit. The controller is configured to obtain at least one operation information from the digital circuit, the operation information includes a software information, a hardware information and a firmware information. The controller is further configured to switch a plurality of working modes of the radio frequency circuit to fit the operation information.

According to an alternative embodiment, a communication device is provided. The communication device includes an antenna module, a radio transceiver and a modem chip. The radio transceiver is coupled to the antenna module. The modem chip is coupled to the radio transceiver. The modem chip includes a radio frequency circuit, a digital circuit and a controller. The digital circuit is coupled to the radio frequency circuit. The controller is coupled to the digital circuit and the radio frequency circuit. The controller is configured to obtain at least one operation information from the digital circuit, the operation information includes a software information, a hardware information and a firmware information. The controller is further configured to switch a plurality of working modes of the radio frequency circuit to fit the operation information.

Figure 1:
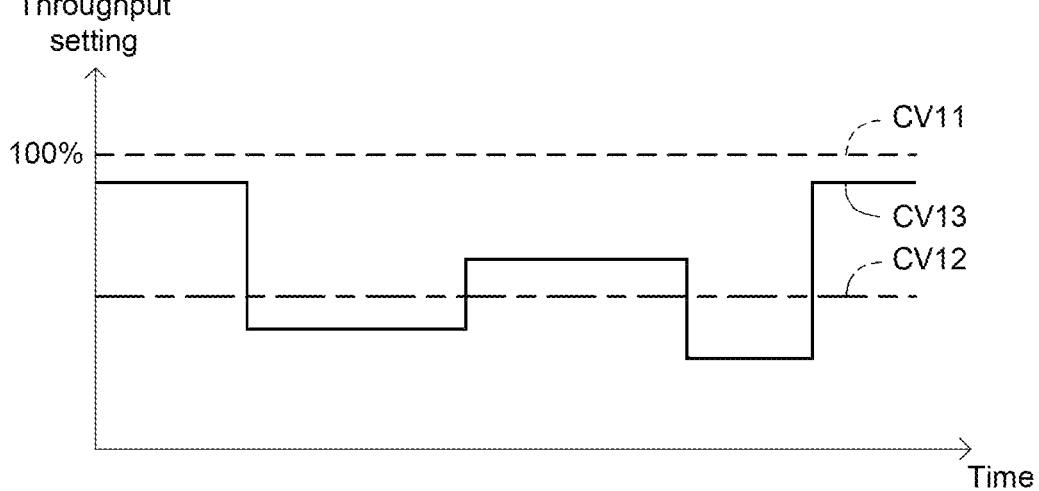
FIG. 1 illustrates a relationship between the throughput and the battery life of a communication device.
Figure 1:
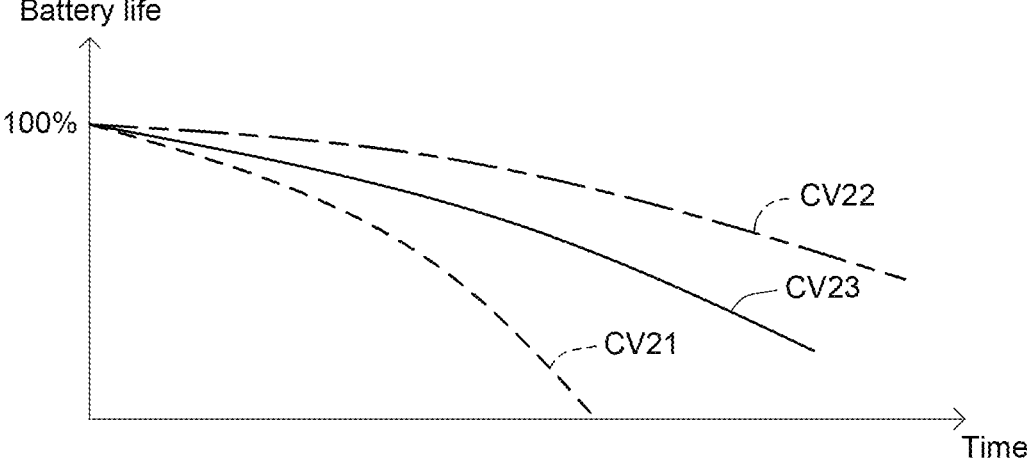

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Certain terms are used in the specification and subsequent claims to refer to particular elements. The ordinary skill in the art will appreciate that a manufacturer may refer to the same element by different terms. This specification does not use the difference in name as a way to distinguish components, but use the difference in function of components as a criterion for distinguishing. The terms "including" and "comprising" mentioned throughout the specification and subsequent claims are open-ended terms, so they should be interpreted as "including but not limited to". In addition, the term "coupled" herein includes any direct and indirect means of electrical connection. Indirect means of electrical connection include connection through other means.

A plurality of embodiments of the present disclosure will be referred to in detail, and the accompanying drawings are made to describe the embodiments of the present disclosure. The following description is some embodiments of the present disclosure, which is for the purpose of describing the principles of the present disclosure, not limiting the present invention. It can be understood that the embodiments of the present disclosure may be implemented by software, hardware, firmware or any combination thereof.

Figure 2:
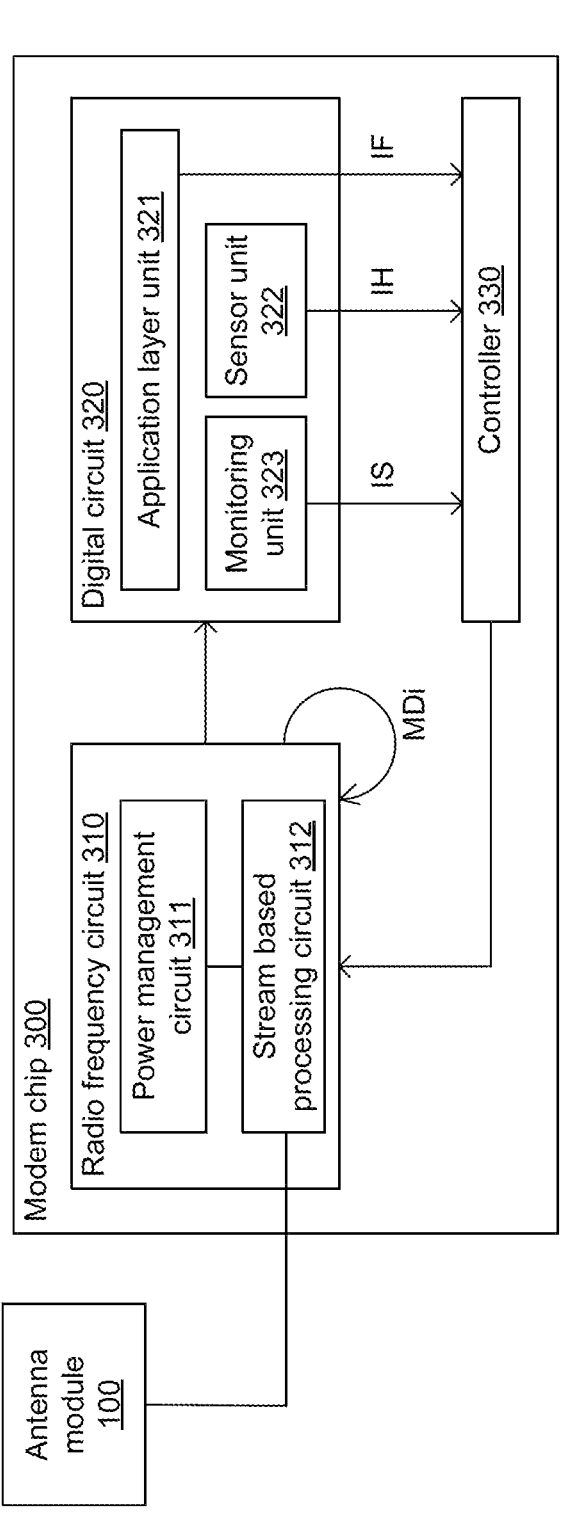
FIG. 2 shows a block diagram of the communication device.

FIG. 1 illustrates a relationship between the throughput and the battery life of a communication device 1000 (shown in FIG. 2). As shown in a throughput setting curve CV11, the throughput setting is kept at a full level. Accordingly, as shown in a battery life curve CV21 corresponding to the throughput setting curve CV11, the battery life is dropped rapidly, and the user experience is affected.

As shown in a throughput setting curve CV12, the throughput setting is kept at a low level for extending the battery life (as shown in a battery life curve CV22). However, when some heavy traffic applications are executed on the communication device 1000, transmission lag, delay or data loss might be happened and the user experience is affected.

In this embodiment, as shown in the throughput setting curve CV13, the throughput setting is dynamically controlled. Comparing the battery life curve CV21 and the battery life curve CV23, the battery life is extended. Comparing the throughput setting curve CV12 and the throughput setting curve CV13, the communication device 1000 could perform well under heavy/light changed traffic applications, such as VoNR, online chatting, web browsing or live stream.

Please refer to FIG. 2, which shows a block diagram of the communication device 1000. The communication device 1000 is, for example, a cell phone, a notebook computer, a tablet computer or smart watch. The communication device 1000 includes an antenna module 100 and a modem chip 300. The modem chip 300 is coupled to the antenna module 100.

The modem chip 300 includes a radio frequency circuit 310, a digital circuit 320 and a controller 330. The radio frequency circuit 310 includes a power management circuit (PMIC) 311 and a stream based processing circuit 312. Some battery-powered devices, such as mobile phones or portable media players, generally have multiple power sources (battery and USB power sources), require multiple power sources with different voltages, and need to control the charge and discharge of the battery. The PMIC 311 is used to manage the power supply of those devices.

The stream based processing circuit 312 is coupled to the PMIC 311. The stream based processing circuit 312 is used for analog signal processing, such as analog signal filtering or amplification, digital signal processing, such as digital signal filtering or an amplification, and high speed serial converting.

The digital circuit 320 is coupled to the radio frequency circuit 310. The digital circuit 320 includes an application layer unit 321, a sensor unit 322 and a monitoring unit 323. The application layer unit 321 includes, for example, a small AP and/or an Android system. The sensor unit 322 includes, for example, temperature sensor, a Gyro sensor and/or a motion sensor. The monitoring unit 323 includes, for example, traffic status monitor, a demod quality monitor, a band/frequency information monitor and/or a transceiver internal interference monitor.

The controller 330 is coupled to the radio frequency circuit 310 and the digital circuit 320. In this embodiment, for balancing the power consummation and the device performance, the controller 330 dynamically switches a plurality of working modes MDi of the radio frequency circuit 310 according to some operation information which includes a software information IS, a hardware information IH and a firmware information IF from the digital circuit 320. In one embodiment, the operation information includes, for example, an out-band channel power, an in-band channel power, a system level stability indication, a wideband/narrowband adjacent channel leakage ratio, a channel interference and/or a received power leakage.

Figure 3:
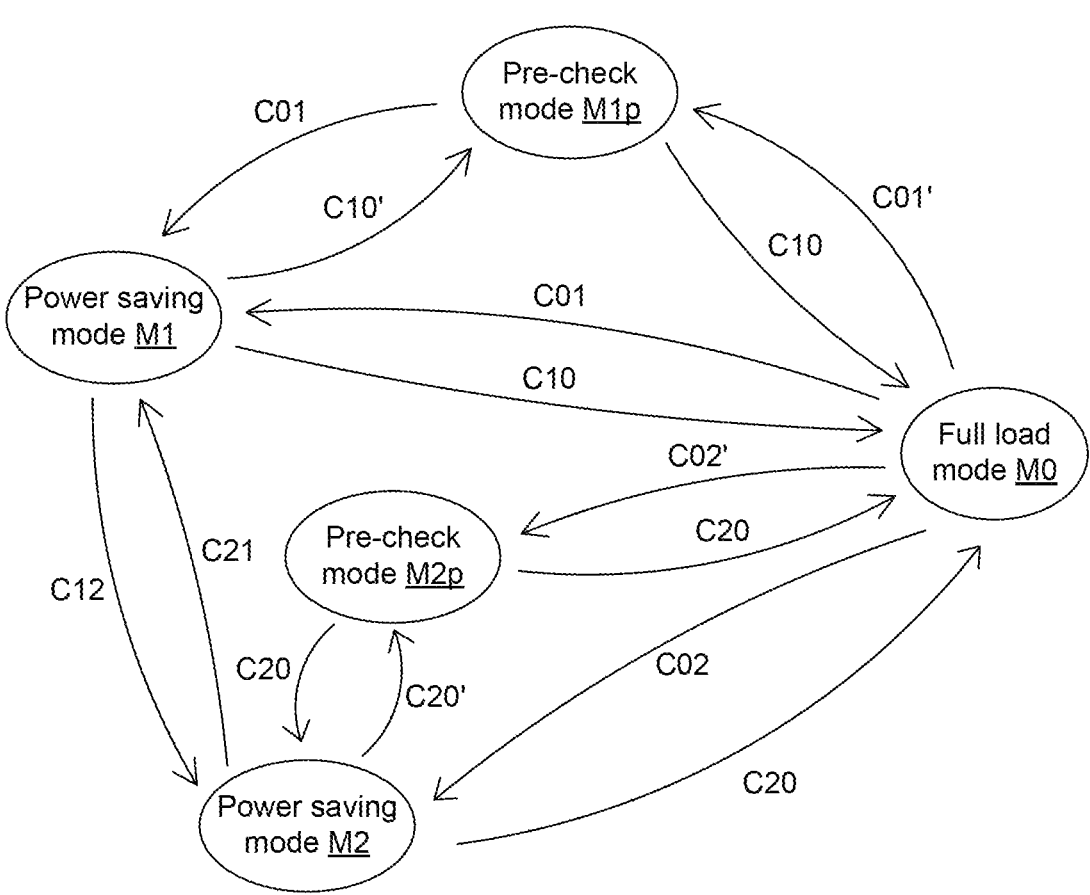
FIG. 3 shows a state machine diagram of a radio frequency circuit of the communication device.

Please refer to FIG. 3, which shows a state machine diagram of the radio frequency circuit 310 of the communication device 1000. The radio frequency circuit 310 includes, for example, a full load mode M0, a plurality of power saving modes, such as power saving modes M1, M2, and a plurality of pre-check modes, such as pre-check modes M1$p$, M2$p$. The number of the power saving modes and the number of the pre-check modes are not used to limit the present invention. The throughput setting during the full load mode M0 is kept at the full level. The throughput setting during the power saving mode M1 is lower than the throughput setting during the full load mode M0. The throughput setting during the power saving mode M2 is lower than the throughput setting during the power saving mode M1. The throughput setting during the pre-check mode M1$p$ is between the throughput setting during the full load mode M0 and the throughput setting during the power saving mode M1. The throughput setting during the pre-check mode M2$p$ is between the throughput setting during the full load mode M0 and the throughput setting during the power saving mode M2.

The full load mode M0 could be switched to the power saving mode M1 or the power saving mode M2. When switching between the full load mode M0 and the power saving mode M1, the pre-check mode M1$p$ is used for smoothly transiting therebetween. When switching between the full load mode M0 and the power saving mode M2, the pre-check mode M2$p$ is used for smoothly transiting therebetween.

Figure 4:
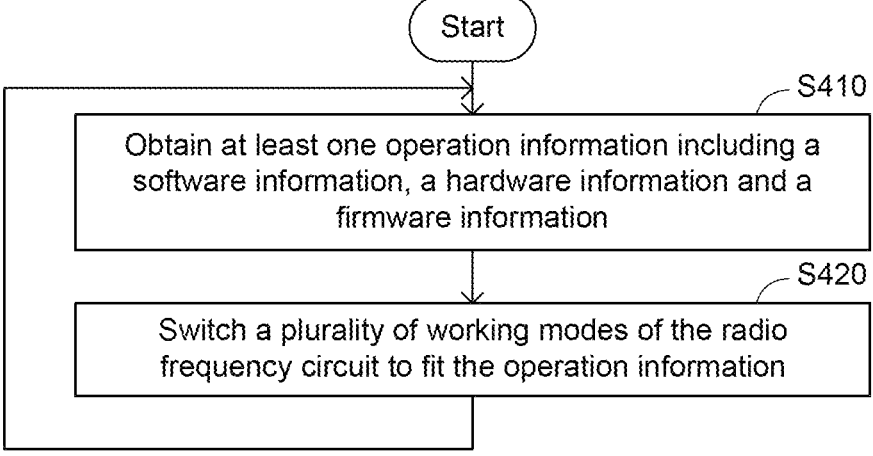
FIG. 4 shows a flowchart of a method for dynamically controlling the radio frequency circuit.

Please refer to FIG. 4, which shows a flowchart of a method for dynamically controlling the radio frequency circuit 310. In the step S410, the controller 330 obtains the operation information including the software information IS, the hardware information IH and the firmware information IF. The software information IS is obtained, for example, from the application layer unit 321. The hardware information IH is obtained, for example, form the sensor unit 322. The firmware information IF is obtained, for example, from the monitoring unit 323.

Then, in the step S420, the controller 330 switches the working modes MDi of the radio frequency circuit 310 to fit the operation information including the software information IS, the hardware information IH and the firmware information IF.

Figure 5:
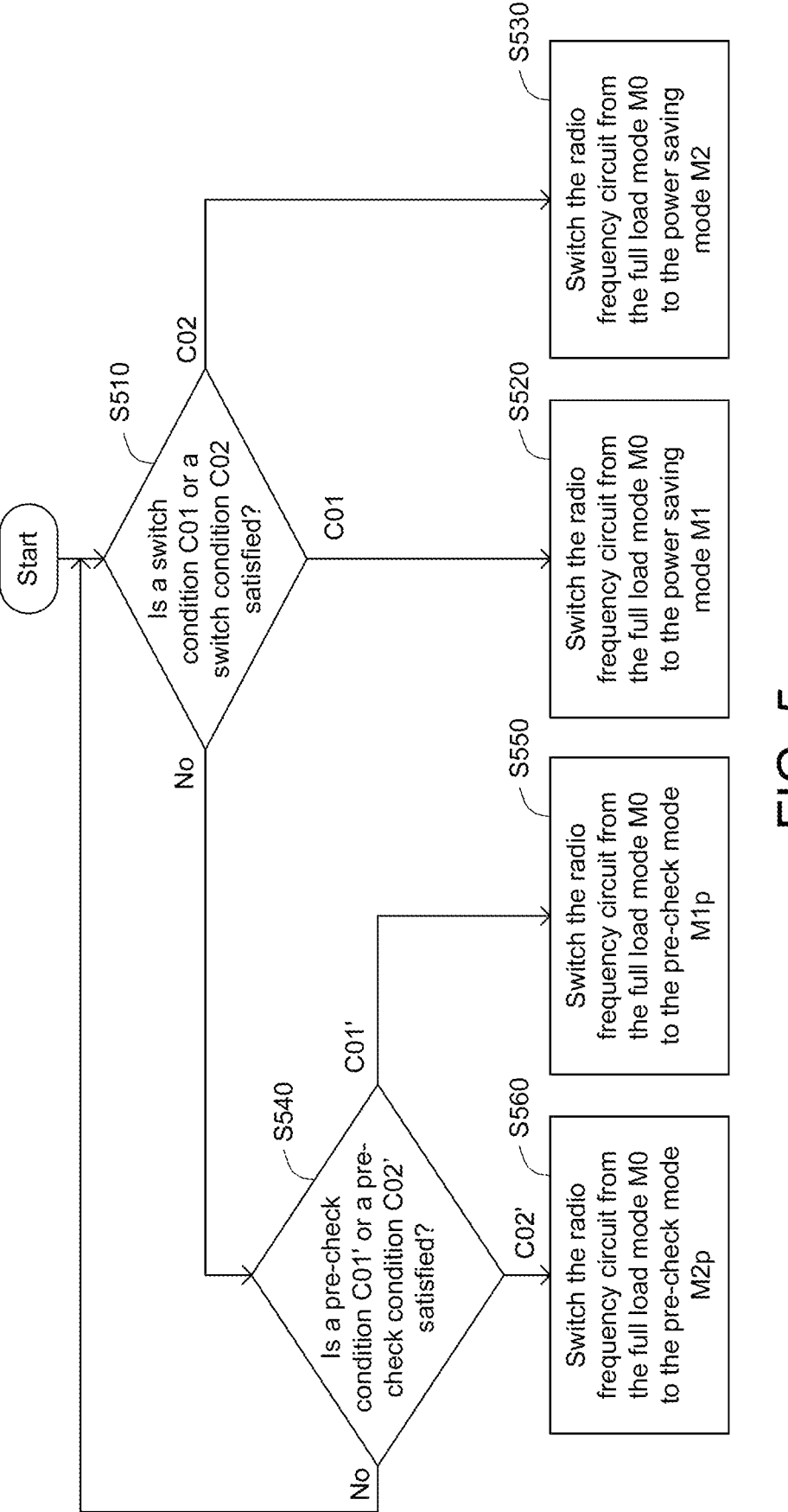
FIG. 5 illustrates an example for switching from a full load mode to different power saving modes.

Please refer to FIG. 3 and FIG. 5. FIG. 5 illustrates an example for switching from the full load mode M0 to the power saving mode M1 or the power saving mode M2. It is noted that this example is used for illustration, not used to limit the present invention. In the step S510, the controller 330 determines whether a switch condition C01 or a switch condition C02 is satisfied. If the switch condition C01 is satisfied, the process proceeds to the step S520; if the switch condition C02 is satisfied, the process proceeds to the step S530; if the switch condition C01 and the switch condition C02 are not satisfied, the process proceeds to the step S540.

In the step S520, the controller 330 switches the radio frequency circuit 310 from the full load mode M0 to the power saving mode M1.

In the step S530, the controller 330 switches the radio frequency circuit 310 from the full load mode M0 to the power saving mode M2.

In the step S540, the controller 330 determines whether a pre-check condition C01' or a pre-check condition C02' is satisfied. If the pre-check condition C01' is satisfied, the process proceeds to the step S550; if the pre-check condition C02' is satisfied, the process proceeds to the step S560; if the pre-check condition C01' and the pre-check condition are not satisfied, the process returns to the step S510.

In the step S550, the controller 330 switches the radio frequency circuit 310 from the full load mode M0 to the pre-check mode M1*p*.

In the step S560, the controller 330 switches the radio frequency circuit 310 from the full load mode M0 to the pre-check mode M2*p*.

Figure 6:
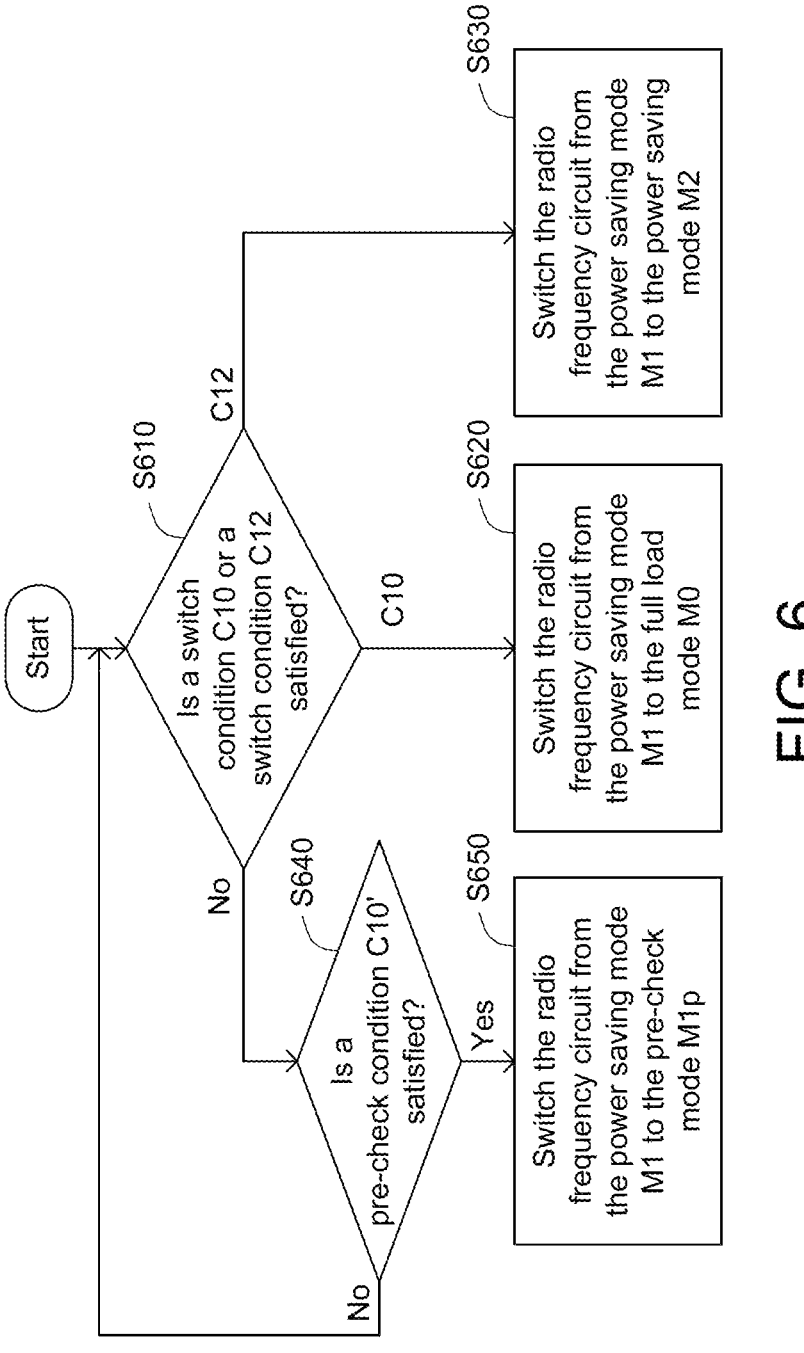
FIG. 6 shows a flowchart of a method for switching from one of the power saving modes to the full load mode or another one of the power saving modes.

Please refer to FIG. 3 and FIG. 6. FIG. 6 shows a flowchart of a method for switching from the power saving mode M1 to the full load mode M0 or the power saving mode M2. It is noted that this example is used for illustration, not used to limit the present invention. In the step S610, the controller 330 determines whether a switch condition C10 or a switch condition C12 is satisfied. If the switch condition C10 is satisfied, the process proceeds to the step S620; if the switch condition C12 is satisfied, the process proceeds to the step S630; if the switch condition C10 and the switch condition C12 are not satisfied, the process proceeds to the step S640.

In the step S620, the controller 330 switches the radio frequency circuit 310 from the power saving mode M1 to the full load mode M0.

In the step S630, the controller 330 switches the radio frequency circuit 310 from the power saving mode M1 to the power saving mode M2.

In the step S640, the controller 330 determines whether a pre-check condition C10' is satisfied. If the pre-check condition C10' is satisfied, the process proceeds to the step S650; if the pre-check condition C10' is not satisfied, the process returns to the step S610.

In the step S650, the controller 330 switches the radio frequency circuit 310 from the power saving mode M1 to the pre-check mode M1*p*.

Figure 7:
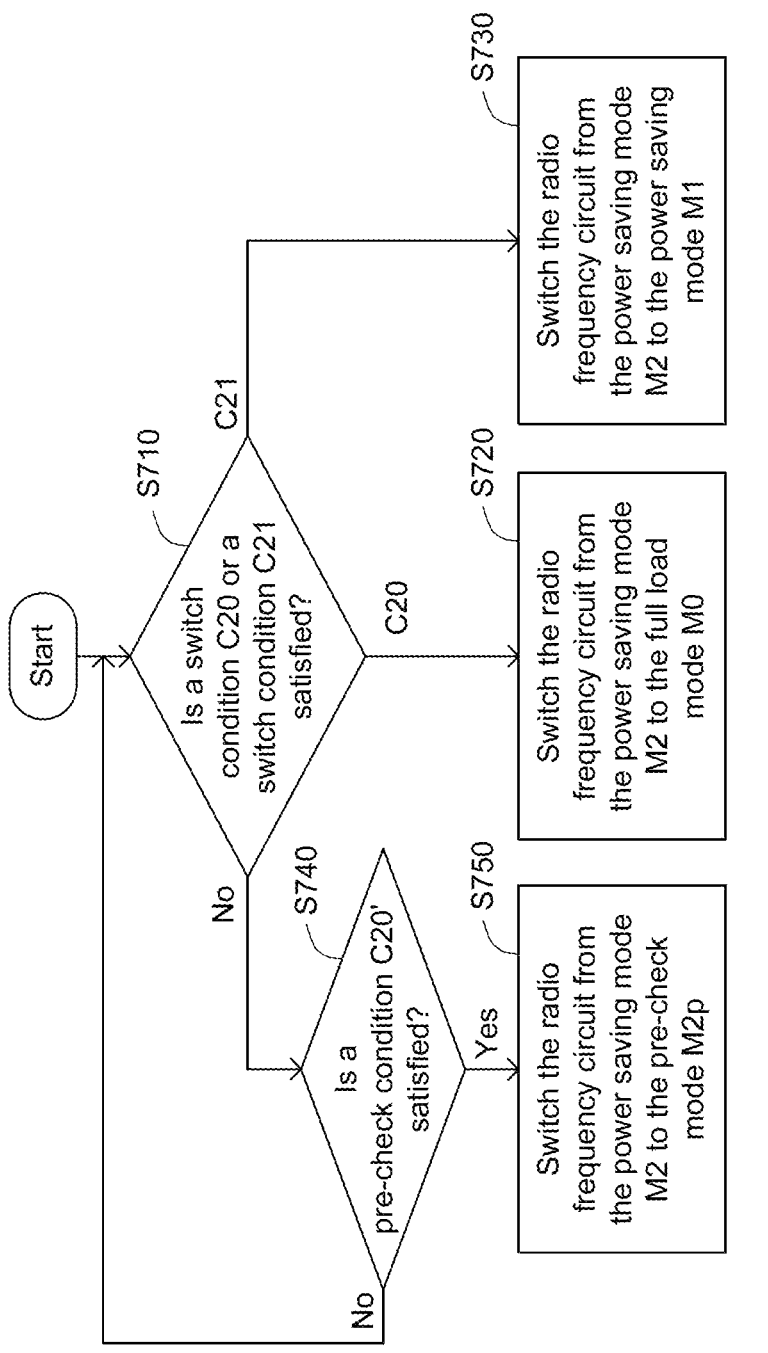
FIG. 7 shows a flowchart of a method for switching from one of the power saving modes to the full load mode or another one of the power saving modes.

Please refer to FIG. 3 and FIG. 7. FIG. 7 shows a flowchart of a method for switching from the power saving mode M2 to the full load mode M0 or the power saving mode M1. It is noted that this example is used for illustration, not used to limit the present invention. In the step S710, the controller 330 determines whether a switch condition C20 or a switch condition C21 is satisfied. If the switch condition C20 is satisfied, the process proceeds to the step S720; if the switch condition C21 is satisfied, the process proceeds to the step S730; if the switch condition C20 and the switch condition C21 are not satisfied, the process proceeds to the step S740.

In the step S720, the controller 330 switches the radio frequency circuit 310 from the power saving mode M2 to the full load mode M0.

In the step S730, the controller 330 switches the radio frequency circuit 310 from the power saving mode M2 to the power saving mode M1.

In the step S740, the controller 330 determines whether a pre-check condition C20' is satisfied. If the pre-check condition C20' is satisfied, the process proceeds to the step S750; if the pre-check condition C20' is not satisfied, the process returns to the step S710.

In the step S750, the controller 330 switches the radio frequency circuit 310 from the power saving mode M2 to the pre-check mode M2*p*.

According to the embodiment described above, the controller 330 dynamically switches the working modes MDi of the radio frequency circuit 310 according to the operation information which includes the software information IS, the hardware information IH and the firmware information IF from the digital circuit 320. The power consummation and the device performance could be balanced. As such, more efficient communication services and improved user experience could be provided.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for dynamically controlling a radio frequency circuit, comprising:

obtaining at least one operation information, wherein the operation information includes a software information, a hardware information and a firmware information; and switching a plurality of working modes of the radio frequency circuit to fit the operation information;

wherein the working modes of the radio frequency circuit further include a plurality of pre-check modes and a plurality of power saving modes, and the step of switching the working modes includes:

switching the radio frequency circuit between one of the pre-check modes and one of the power saving modes.

2. The method for dynamically controlling the radio frequency circuit according to claim 1, wherein the working modes of the radio frequency circuit further include a full load mode.

3. The method for dynamically controlling the radio frequency circuit according to claim 2, wherein the step of switching the working modes includes:

switching the radio frequency circuit from the full load mode to one of the power saving modes;

switching the radio frequency circuit from one of the power saving modes to the full load mode.

4. The method for dynamically controlling the radio frequency circuit according to claim 2, wherein the step of switching the working modes includes:

switching the radio frequency circuit between two of the power saving modes which are adjacent.

5. The method for dynamically controlling the radio frequency circuit according to claim 2, wherein the step of switching the working modes further includes:

switching the radio frequency circuit between the full load mode and one of the power saving modes.

6. The method for dynamically controlling the radio frequency circuit according to claim 1, wherein the radio frequency circuit includes a power management circuit and a stream based processing circuit.

7. The method for dynamically controlling the radio frequency circuit according to claim 1, wherein the operation information includes an out-band channel power and an in-band channel power.

8. The method for dynamically controlling the radio frequency circuit according to claim 1, wherein the operation information includes a system level stability indication.

9. The method for dynamically controlling the radio frequency circuit according to claim 1, wherein the operation information is a wideband/narrowband adjacent channel leakage ratio, a channel interference or a received power leakage.

10. A modem chip, comprising:

a radio frequency circuit;

a digital circuit, coupled to the radio frequency circuit; and a controller, coupled to the digital circuit and the radio frequency circuit, wherein the controller is configured to obtain at least one operation information from the digital circuit, the operation information includes a software information, a hardware information and a firmware information; and is further configured to switch a plurality of working modes of the radio frequency circuit to fit the operation information;

wherein the working modes of the radio frequency circuit further include a plurality of pre-check modes and a plurality of power saving modes;

the controller is further configured to switch the radio frequency circuit between one of the pre-check modes and one of the power saving modes.

11. The modem chip according to claim 10, wherein the working modes of the radio frequency circuit further include a full load mode.

12. The modem chip according to claim 11, wherein the controller is further configured to switch the radio frequency circuit from the full load mode to one of the power saving modes; and is further configured to switch the radio frequency circuit from one of the power saving modes to the full load mode.

13. The modem chip according to claim 11, wherein the controller is further configured to switch the radio frequency circuit between two of the power saving modes which are adjacent.

14. The modem chip according to claim 11, wherein the controller is further configured to switch the radio frequency circuit between the full load mode and one of the power saving modes.

15. The modem chip according to claim 11, wherein the radio frequency circuit includes a power management circuit and a stream based processing circuit.

16. The modem chip according to claim 10, wherein the operation information includes an out-band channel power and an in-band channel power.

17. The modem chip according to claim 10, wherein the operation information includes a system level stability indication.

18. The modem chip according to claim 10, wherein the operation information is a wideband/narrowband adjacent channel leakage ratio, a channel interference or a received power leakage.

19. A communication device, comprising:

an antenna module;

a radio transceiver, coupled to the antenna module; and a modem chip, coupled to the radio transceiver, wherein the modem chip comprises:

a radio frequency circuit;

a digital circuit, coupled to the radio frequency circuit; and a controller, coupled to the digital circuit and the radio frequency circuit, wherein the controller is configured to obtain at least one operation information from the digital circuit, the operation information includes a software information, a hardware information and a firmware information; and is further configured to switch a plurality of working modes of the radio frequency circuit to fit the operation information;

wherein the working modes of the radio frequency circuit further include a plurality of pre-check modes and a plurality of power saving modes;

the controller is further configured to switch the radio frequency circuit between one of the pre-check modes and one of the power saving modes.

20. The communication device according to claim 19, wherein the working modes of the radio frequency circuit further include a full load mode.

* * * * *